Figure 6:
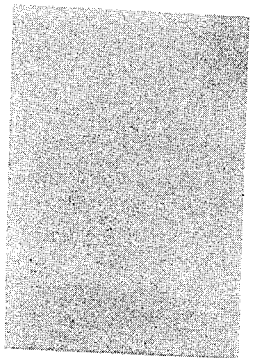

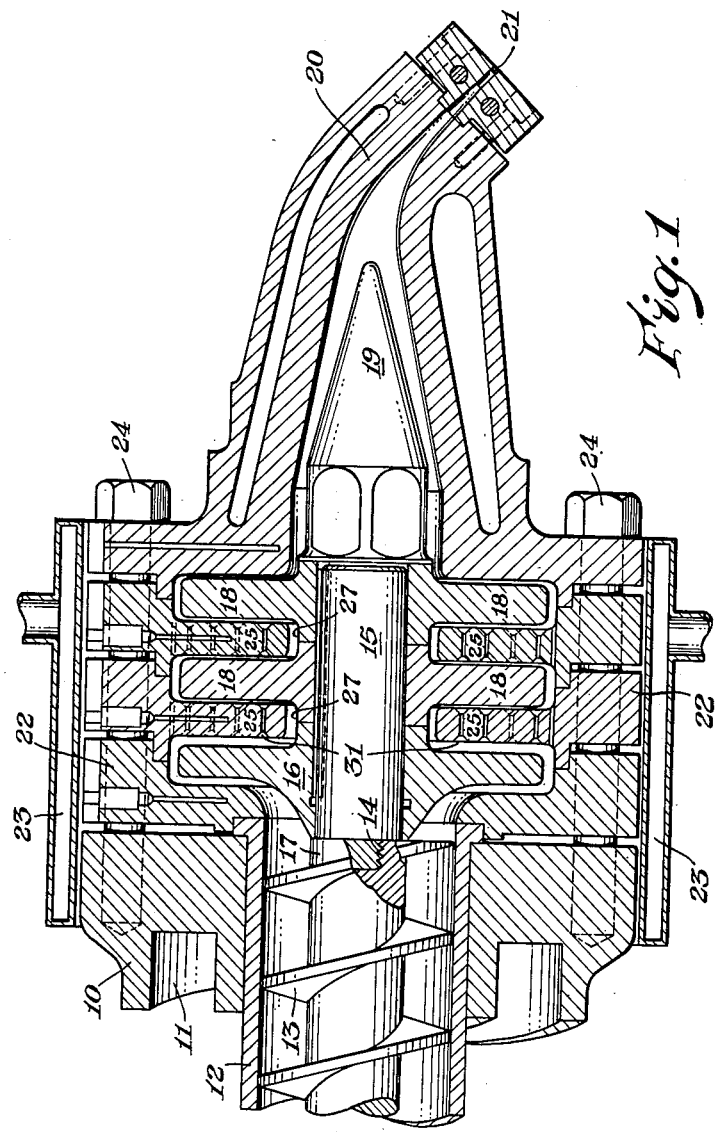

March 29, 1955  O. E. ROSS ET AL  2,705,131
MIXING HEAD FOR PLASTICS EXTRUDERS
Filed Feb. 5, 1954                                3 Sheets-Sheet 2
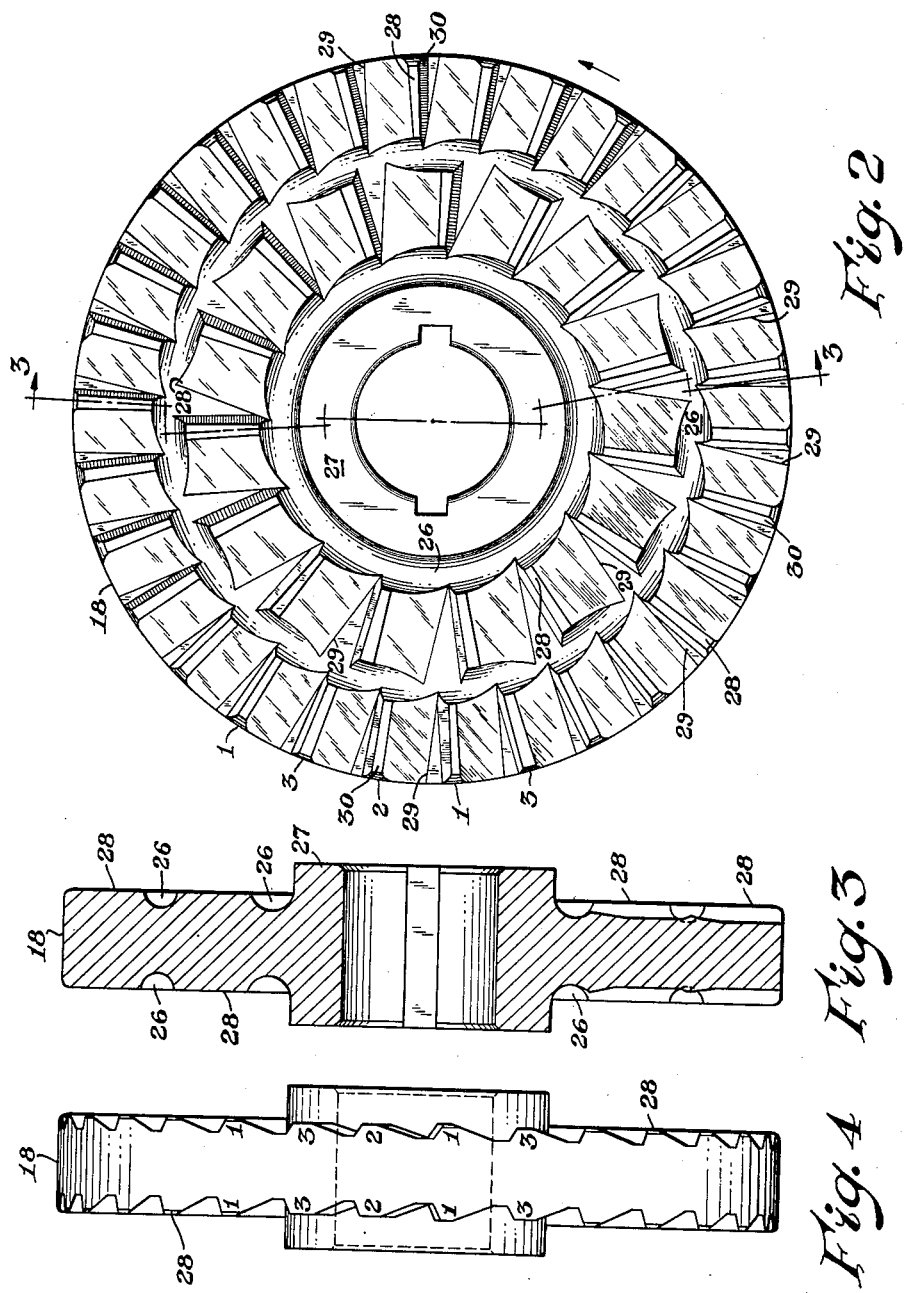
INVENTORS.
Oren E. Ross
Jack L. Williams
BY
Griswold & Burdick
ATTORNEYS.

March 29, 1955 O. E. ROSS ET AL 2,705,131
MIXING HEAD FOR PLASTICS EXTRUDERS
Filed Feb. 5, 1954
3 Sheets-Sheet 3

INVENTORS.
Oren E. Ross
Jack L. Williams

BY
Griswold & Burdick
ATTORNEYS.

United States Patent Office 2,705,131
Patented Mar. 29, 1955

2,705,131

MIXING HEAD FOR PLASTICS EXTRUDERS

Oren E. Ross and Jack L. Williams, Midland, Mich., assignors to The Dow Chemical Company, Midland, Mich., a corporation of Delaware Application February 5, 1954, Serial No. 408,510

4 Claims. (Cl. 259—25)

This invention relates to an improved mixing section for extrusion machines, particularly adapted to homogenize organic thermoplastic masses prior to their extrusion through a forming orifice.

In recent years much attention has been paid to apparatus capable of simplifying the operations of blending and extruding thermoplastic compositions. Thus, while it was formerly considered necessary to blend coloring matter, lubricants, plasticizers or other modifiers with the plastic material, and to extrude the compositions in separate apparatus, and usually in a repeated series of operations, there have been developed various modified extruders which effect blending and extrusion in a single unit. Some of the modifications involve elongation of the working barrel of the extruder to accommodate a long mixing torpedo, such as those shown in U. S. Patents 2,453,088 and 2,607,077. These types can effect the required mixing operation, but have the obvious disadvantage of requiring an elongated barrel or a shortened feed screw, either of which may be undesirable in certain circumstances. Other modifications, such as that shown in U. S. Patent No. 2,469,999, use a rather short mixing head consisting of a series of perforated plates, alternate ones of which are fixed while the intervening ones rotate with the feed screw.

The last described mixing device effects better mixing in a single pass through the machine than the earlier mixer-extruders, and is satisfactory for making colored plastic masses when the composition is to be used in making articles with thicknesses of 0.05 inch or more. When the product from such a mixer is used to make articles under 0.05 inch thick, the articles are observed to be mottled, rather than homogeneous, and this effect becomes more pronounced the thinner the article. Hence, it is apparent that the presumed homogeneity of pigmented plastic masses produced with the aid of the described prior mixing head is relative and illusory and that further improvement is required if the composition is to appear homogeneous in thin sections.

Accordingly, it is the principal object of the present invention to provide an improved mixing section for plastics extruders, capable of developing in the plastic mass being extruded such a degree of homogeneity that articles made from the mass with thicknesses under 0.05 inch do not appear mottled.

The improvement which constitutes the present invention is a mixing section placed in the line of plastic flow either between two sections of the forwarding mechanism or between the end of the screw and the extrusion orifice, comprising a short chamber, conveniently but not necessarily of greater diameter than the barrel around the screw, with a series of rotary disks mounted on a short extension of the screw, and interleaved stationary plates secured in the chamber housing. The stationary plates may preferably, but need not, be perforated, and they have plane surfaces, as will be described, while the rotary disks may be, but preferably are not perforated, and have a particular surface configuration, described hereinafter. The rotary disks and stationary plates are spaced to provide a working clearance between them. The actual spacing will depend on the size of the apparatus and the amount of stress to which the plates are subjected, and may commonly be of the order of 0.005 to 0.030 inch on each face.

Figure 5:
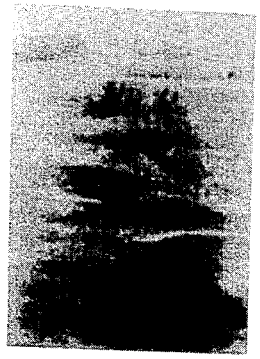

The invention will be described as a mixing head, reference being made to the annexed drawings, in which Fig. 1 is a vertical section through the mixing head, showing the relationship of the parts;
Fig. 2 is an elevation of the working face of one of the rotary disks;
Fig. 3 is a cross-section through the disk of Fig. 2, taken along the line 3—3;
Fig. 4 is a side elevation of the disk of Fig. 2;
Fig. 5 is a photograph of a molded sheet 0.005 inch thick made from pigmented plastic mixed in and extruded from the apparatus of U. S. Patent No. 2,469,999; and,
Fig. 6 is a photograph of a molded sheet 0.005 inch thick made from the same pigmented plastic composition, mixed in and extruded from the apparatus of this invention.

Referring to Fig. 1, the assembly of parts is like that in U. S. Patent No. 2,469,999. A conventional extruder barrel 10 has the usual heating jacket 11 and barrel liner 12, within which feed screw 13 operates. Feed screw 13 is axially drilled and tapped at its forward end to receive a threaded extension 14 of the axle 15 of the rotary members of the new mixer. The first rotary member, in the line of flow of the plastic material, is a frusto-conical deflector plate 16, presenting an outwardly flaring surface continuous with the surface of the hub 17 of screw 13. The succeeding rotary members, in the path of the moving plastic material, are two or more imperforate disks, hereinafter referred to as mixing plates 18, having the configuration shown in Figs. 2–4. Also mounted coaxially on the hub 15, beyond the last mixing plate 18 in the embodiment shown, is a conical torpedo 19 extending into the nose-piece 20 of the machine, but terminating short of the orifice 21. It is understood that the last plate 18 may be followed by another length of forwarding screw, if desired, before the plastic matter reaches the orifice. The rotor assembly is enclosed in a segmented housing 22, provided with a heating jacket 23, if desired, the segments being fastened together and to the extruder barrel 10 as by tie-bolts 24. Housing 22 carries a plurality of transversely disposed, and preferably perforated plates 25 so-positioned as to interleave deflector plate 16 and the mixing plates 18. The clearance between the plates 25 and the rotary mixing plates 18 is of the order of 0.005 to 0.030 inch, when the machine is intended to be used with the common highly viscous plastic materials. In any case, the spacing is such as to assure a shearing action on the plastic material between the fixed plates 25 and the moving mixing plates 18.

The mixing plates 18 have a concentric groove 26 on each face, adjacent the hub 27, and may have other such grooves spaced between the inner groove 26 and the outer edge of the plate. In the illustrated embodiment there are two grooves 26, and two concentric rows or courses of mixing ridges 28 are disposed on each surface of the mixing plates 18, one row spanning the distance between the outer edge of plate 18 and the outer groove 26, and the other row spanning the distance between the two concentric grooves 26.

The illustrated ridges 28 in each row have both their leading and their trailing edges lying along radii of plate 18, and in this position they exert no directing effect on the plastic matter. They may be disposed with these edges parallel to radii, or at a small leading or trailing angle thereto, to direct the plastic flow. The ridges 28 are so contoured that the leading edge 29 lies in the plane of the base of grooves 26 while the trailing edge projects outside of that plane, and the elongated leading face of each ridge 28 may be a plane but preferably is cylindrically concave, while the trailing face 30 is an abrupt step at from 60° to 90° with respect to the plane of the base of the grooves 26. The apexes of the ridges 28 in each row are machined in a repetitive sequence to provide graded clearances from the adjacent fixed plates 25 in the assembled mixing section. Thus, for example, during rotation of a mixing plate 18, the ridges 28 may alternately have clearances of 0.020 and 0.030 inch from the fixed plate 25, or they may present in repeated sequence clearances of 0.020, 0.040, 0.060, 0.020, . . . inch. Such a condition is illustrated in Fig. 4, where successive ridges 28 (marked 1, 2, 3) are shown as having successively smaller altitudes. With two sets of ridges 28, it is preferable that there be fewer of the mixing ridges in the inner set than in the outer set on each face of the rotary disks 18, and in one practical embodiment (Fig. 2) there are 30 such radial ridges 28 in the outer set and only 15 of them in the inner set.

In the operation of the present apparatus, the plastic mixture to be homogenized is supplied by the feed screw 13 to the mixing section, and is initially caused to flow radially out and around the rotating deflector plate 16. After passing the outer edge of plate 16, the plastic material is deflected back toward the rotating axle of the mixer, past the immobile surface of a fixed plate 25. When plate 25 is perforated, the pressure maintained by the feed screw 13 is sufficient to force a portion of the plastic mass through perforations 31 in plate 25 into the relatively small space between plate 25 and a mixing plate 18. Thus, some of the plastic mass is distributed through a portion of the stream which has gone before, while the rest passes around plate 25 into the constricted space adjacent plate 18 and is mixed with portions of the mass coming through the perforations 31 which portions have left the screw section more recently. This accomplishes the mixing described in U. S. Patent No. 2,469,999.

In addition to the mixing just described, a much more thorough blending takes place in the constricted channel between rotating disks 18 and perforated fixed plates 25. In this zone, the plastic mass must follow a sinuous path and pass successively from near the rotating hub 27 to the outer edge of disk 18 and back toward the axis of the mixer. In so doing it must first pass the outer row of ridges 28 (Figs. 2–4), then the outer circular groove 26, the inner row of ridges 28 and the inner circular groove 26. The velocity of the plastic mass is high in the constricted area facing the mixing ridges, and is much lower in the greater free space of the circular grooves. In the zone of operation of ridges 28, the highest ridge (1) picks up and forwards most of the plastic mass deposited by the preceding lowest ridge on the face of adjacent fixed plate 25. The succeeding, slightly lower ridge (2) has greater clearance from plate 25 and deposits thereon a slightly thicker layer of the plastic mass than is left by the preceding, highest ridge. Finally, the succeeding lowest ridge (3) has still greater clearance from fixed plate 25 and deposits over prior layers an additional thickness of the plastic mass, and most of the so-deposited layer will be scraped off and forwarded by the next succeeding highest ridge (1). This continuously repeated action thoroughly mixes plastic matter of varying histories in the apparatus. When plates 25 are perforate, the films spread on the fixed plates 25 are continuously being perforated by and blended with plastic material forced through perforations 31, when on the upstream plate 25, and are constantly losing material through corresponding perforations, when on the downstream plate 25. The various increases and decreases in velocity of the plastic, together with the shortcuts provided by the perforations 31 in plates 25, combine with the graded smearing and shearing actions of the stepped ridges 28 on rotary plates 18 to effect a substantially perfect homogenization of the mass.

In a specific example, a pigmented polystyrene composition was fed from a 6-inch extruder screw to a mixing head 12 inches in diameter constructed like that of U. S. Patent 2,469,999, with each fixed and each rotating plate having from 140 to 160 evenly distributed one-eighth inch diameter perforations. The so-worked mass was extruded as a thin sheet, broken into molding granules, and test moldings were made in the form of sheets 0.005 inch thick. A photograph of the molded piece is reproduced as Fig. 5 of the annexed drawings. The molding is visibly mottled. Some of the same pigmented polystyrene mixture was supplied in like manner to the mixing head of the present invention. Again, the extruder screw was of 6-inch diameter, the mixing plates had diameters near 12 inches, and the perforated, fixed plates 25 had from 140 to 160 evenly distributed one-eighth inch diameter perforations. The rotating mixing plates 18 had two concentric rows of the described stepped ridges 28, and these plates 18 were mounted with clearances of 0.020, 0.040 and 0.060 inch between successive ridges 28 and the fixed plates 25. There were 30 ridges 28 in the outer course on each plate 18 and 15 such ridges in the inner course. The output of each machine was the same (over 500 pounds per hour). Both machines had the same number of fixed and of rotating plates in the mixing head. The composition emerging from the machine of the present invention was formed into molding granules and test moldings 0.005 inch thick were made in the same manner as before. These were found to be free from mottling and striations, and a photograph of such a molding is reproduced as Fig. 6 of the annexed drawings.

We claim:

1. In an extruder for organic thermoplastics, having a mixing section of circular cross-section coaxial with the extruder screw, in which there are interleaved transverse mixing plates, alternate ones of which are mounted for rotation on an axial extension of the screw and extend radially nearly to the wall of the mixing head and the others of which are symmetrical rings fixed in the said wall and extending nearly to said axial extension which passes through them, the improved rotary mixing plate which consists in: an imperforate disk having an axial hub and having on each face at least one concentric circular groove, the innermost of which is smoothly contoured at its inner edge to said hub; at least one concentric circular course of mixing ridges disposed at a greater radial distance from the axis than said groove, the ridges in each course being approximately radially disposed and having elongated leading faces and abrupt trailing faces each extending to the depth of the adjacent groove, the apexes of the ridges in each course being of regularly patterned graded height from the base plane of the grooves, to provide repeated variations in clearance from the neighboring fixed plate, said improved rotary mixing plate being mounted with a close working clearance with respect to the adjacent fixed plate.

2. The improvement claimed in claim 1, wherein there are two concentric grooves and two circular courses of mixing ridges on each face of the rotary mixing plate.

3. The improvement claimed in claim 2, wherein there are about twice as many mixing ridges in the outer course as in the inner course.

4. The improvement claimed in claim 1, wherein the ridges in each course are of graded heights in repeated series of three, with the leading member of each series providing the least clearance from the neighboring fixed plate and the trailing member of each series providing the greatest clearance from said fixed plate.

References Cited in the file of this patent

UNITED STATES PATENTS

| | | |
|---|---|---|
| 2,039,162 | Gerstenberg | Apr. 28, 1936 |
| 2,469,999 | Stober | May 10, 1949 |
| 2,612,354 | Dron | Sept. 30, 1952 |
| 2,661,192 | Horsley et al. | Dec. 1, 1953 |